(12) United States Patent
Ottusch et al.

(10) Patent No.: US 12,140,097 B2
(45) Date of Patent: Nov. 12, 2024

(54) METHOD FOR OPERATING A MOTOR VEHICLE WITH A COMBUSTION ENGINE

(71) Applicant: Robert Bosch GmbH, Stuttgart (DE)

(72) Inventors: Frank Ottusch, Weil der Stadt (DE); Jan Kappa, Ludwigsburg (DE); Jurij Woelfling, Bietigheim-Bissingen (DE); Kosuke Tamanoi, Stuttgart (DE); Roberto Verrino, Stuttgart (DE); Timm Hollmann, Benningen A.N (DE)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 17/843,351

(22) Filed: Jun. 17, 2022

(65) Prior Publication Data
US 2023/0022334 A1 Jan. 26, 2023

(30) Foreign Application Priority Data

Jul. 19, 2021 (DE) .......................... 102021207655.6

(51) Int. Cl.
*F02D 41/02* (2006.01)
*F02D 41/14* (2006.01)

(52) U.S. Cl.
CPC ....... *F02D 41/027* (2013.01); *F02D 41/0295* (2013.01); *F02D 41/1441* (2013.01); *F02D 41/1461* (2013.01)

(58) Field of Classification Search
CPC ............. F02D 41/1441; F02D 41/1461; F02D 41/0295; F02D 41/027; F02D 2200/701; F02D 41/123; F02D 41/1406; F02D 41/1444; F02D 41/1452; F02D 41/1463; F02N 11/0818; Y02T 10/40
See application file for complete search history.

(56) References Cited

U.S. PATENT DOCUMENTS

| 2014/0109868 A1* | 4/2014 | Zhu | F02D 41/0072 |
| | | | 123/349 |
| 2018/0023440 A1* | 1/2018 | Cho | F01N 3/0842 |
| | | | 60/274 |
| 2019/0360414 A1* | 11/2019 | Buerger | F02D 41/021 |

FOREIGN PATENT DOCUMENTS

| DE | 102004030782 A1 | 1/2006 |
| TR | 201601757 | * 8/2016 |

OTHER PUBLICATIONS

Reif, editor, "Exhaust Technology for Internal Combustion Engines", 2015, 15 pages.

(Continued)

*Primary Examiner* — Phutthiwat Wongwian
*Assistant Examiner* — Diem T Tran
(74) *Attorney, Agent, or Firm* — Michael Best & Friedrich LLP

(57) ABSTRACT

The invention concerns a method (200) for operating a motor vehicle (100) with a combustion engine (110), including the determination (210) of a current operating state of the vehicle (100), the determination (220) of an emission state of the vehicle (100) during the determined operating state, carrying out (230) at least one measure to reduce emissions depending on the emission state and evaluating (240) the at least one measure in connection with the operating state with regard to its success in reducing emissions. Furthermore, a computing unit (130) and a computer program product for carrying out such a method (200) are proposed.

8 Claims, 2 Drawing Sheets

(56) References Cited

OTHER PUBLICATIONS

Merker and Teichmann, editors, "Basics of combustion engines: Functionality, Simulation, Measurement Technology", 2014, 14 pages.

* cited by examiner

METHOD FOR OPERATING A MOTOR VEHICLE WITH A COMBUSTION ENGINE

BACKGROUND OF THE INVENTION

The present invention relates to a method for operating a motor vehicle with a combustion engine and a computing unit and a computer program for carrying it out.

The operation of motor vehicles with a combustion engine typically produces pollutants whose emission into the atmosphere is strictly limited by law. In order to reduce emissions, exhaust gas aftertreatment is therefore usually carried out, during which pollutants are converted into less problematic substances. Furthermore, the operation of the combustion engine can be controlled in such a way that it produces fewer pollutants from the outset.

Various functionalities, each modelling part of the exhaust gas aftertreatment (for example catalytic converter, particulate filter), as well as other coordinators (for example engine coordinator, lambda coordinator, temperature management) can be stored in control units for motor vehicles with combustion engines. The various functionalities communicate with each other and send requirements to others of the functions in particular.

An application can be used to ensure that the various requirements are stored with priorities and thus a certain order of events is ensured. With the application, a strategy can also be defined, which is not changed during operation in the vehicle. This strategy can affect the prioritization of requirements depending on the system condition and thus the emitted emissions at the same time.

Especially for petrol engines, torque control can be provided for the implementation of the driver's desired torque, wherein current emissions, which can be detected, for example, by means of sensors, are taken into account by means of a pilot controller.

SUMMARY OF THE INVENTION

According to the invention, a method for operating a motor vehicle with a combustion engine and a computing unit and a computer program for carrying it out.

The invention concerns vehicle concepts in which a combustion engine is used. The invention covers the various vehicle concepts with regard to the additional installation of an electric drive machine (hybrid vehicles) and is also independent of the configuration of the exhaust system (three-way catalytic converter, particulate filter, . . . ). With the present invention, a statistical evaluation of the emissions in relation to the driving conditions which have been passed through is to be taken into account in the selection of interventions of the emission-based engine control in the operating behavior of the combustion engine to reduce the emissions (hereinafter referred to as measures). Both the emissions already emitted and the driving conditions that have been passed through in the past (for example engine operating points, engine overrun phases, start-stop phases, . . . ) can be taken into account and correlated with each other. This includes both the correlation between the integrated emissions and the frequency of different driving conditions over the previously driven route as well as the evaluation of individual emission events in the respective driving condition. In addition, a continuous evaluation and correction of the initiated measures of emission-based engine management are to be derived from this information by means of adaptive learning in order to effectively improve the emission behavior from what has been learned so far.

In detail, the method according to the invention for operating a motor vehicle with a combustion engine includes the determination of a current operating state of the vehicle, the determination of an emission state of the vehicle during the determined operating state, carrying out at least one measure to reduce emissions depending on the emission state and evaluation of at least one measure in relation to the operating condition with regard to the success thereof in reducing emissions. This makes it possible to determine whether and to what extent a measure to reduce pollutant emissions is successful in certain driving situations.

Here an emission state means a current or instantaneous (related to the respective operating state) exhaust gas composition or an absolute amount of certain exhaust gas components related to an operating time and/or driving distance, in particular with regard to legally limited pollutants, such as nitrogen oxides ($NO_x$), carbon monoxide (CO), hydrocarbons (HC), ammonia ($NH_3$), soot particles and/or carbon dioxide ($CO_2$), wherein in particular exhaust gas that leaves the motor vehicle is considered. For example, data from suitable sensors and/or model calculations can be used to evaluate the emission state.

The operating state typically includes occurring events, such as start-stop phases, engine overrun and coasting phases, cold start, and the like. It can be determined, for example, on the basis of one or more operating parameters, in particular one or more from the group of a drive power, a torque, a speed, an exhaust gas mass flow, an exhaust gas composition (for example lambda value), a catalytic converter state (for example oxygen level), a temperature of the combustion engine and/or a catalytic converter, an outside temperature, a driving speed, a geographical position and a personal identity. This means that many relevant operating parameters can be used for the process. For example, classic parameters of the combustion engine are covered as well as characteristics in a typical driving style of a person or a route profile anticipated on the basis of a certain geographical location, wherein the latter is derived from a history of use of the specific motor vehicle (i.e. from previous evaluations of measures). For example, a personal identity can be recognized directly via a corresponding user input, via a key identification of an ignition key or via typical driving style elements, while the geographical position can be determined by means of GPS sensors, mobile phone data or the like.

The combination of a number of these operating parameters usually allows a good prediction of the efficiency of individual measures to reduce emissions in the specific driving situation (i.e. the current operating condition), wherein vehicle-specific influences on the efficiency of certain measures can also be taken into account by means of the evaluation history.

In particular, the method includes a combination of multiple evaluations which were made in connection with comparable operating states and/or in relation to identical measures. Comparable operating states are characterized in particular by an identical categorization. For example, all engine overrun phases can be considered comparable to each other, while start-stop phases may not be considered comparable to engine overrun phases. The comparability of certain operating states can also be characterized by a difference and/or by value ranges of the operating parameters used for the determination, i.e. two operating states are comparable if values for underlying operating parameters differ by less than a given threshold and/or are in the same range of values. It is understood that thresholds and value ranges for different operating parameters and optionally also different measures can be different. This improves the statistics of the success evaluation and learning effects can be achieved with regard to the success of a measure.

The combination may include a combination of evaluations relating to multiple driving cycles. This improves statistics and thus robustness of the results even further.

In particular, the combination can be done by determining an integrated emission state and assigning a frequency of the operating state or all operating states determined during the integration period to the integrated emission state and/or by accumulating separately conducted evaluations. These are mathematically manageable possibilities for a statistically significant recording of a large number of emission-relevant events.

Advantageously, in addition to the combination of multiple evaluations, the method also includes a weighting of the results of the evaluation as a function of a time that has elapsed since the evaluation, in particular wherein more recent results are weighted more strongly than older results. As a result, changes to the vehicle, for example due to aging effects, can be recorded and quickly incorporated without losing the advantage of good statistics.

The method may also include the performance of at least one measure depending on the outcome of the evaluation(s) and on the actual emission state and the current operating state. In this way, the evaluation results can be used to select the most promising measure(s) for emission reduction in the respective situation or to carry out the measure which is to be carried out adapted to the respective situation. In other words, for example, another measure can be selected in the future if a particular measure has been assessed as insufficient, or the intensity of the measure can be adjusted in order to achieve a better evaluation result in the future.

The at least one measure is obtained in particular from the group including a reduction or increase of rich gas contents in a catalytic converter purging, a time extension or shortening of a catalytic converter purging, an increase or decrease of a minimum temperature of a catalytic converter, influencing a lambda controller to a rich or lean target lambda, an adjustment of a target oxygen level in a catalytic converter, a restriction of permissible operating points of the combustion engine, the inhibition of the switch-off of engine overrun, the inhibition of a start-stop mode, influencing the enabling and/or inhibition and/or coordination of intrusive diagnostics, tank ventilation, and exhaust gas recirculation, as well as, especially in systems with hybrid electric-combustion power drives, an operating point shift and a dynamic influence. This means that a large number of measures are available, each of which has an optimal effectiveness for reducing emissions in different situations or operating states.

A computing unit according to the invention, for example a control unit of a motor vehicle, is set up, in particular programmatically, to carry out a method according to the invention.

Also the implementation of a method according to the invention in the form of a computer program or computer program product with program code for carrying out all process steps is advantageous, since this causes particularly low costs, in particular if an executing control unit is also used for further tasks and is therefore already present. Finally, a machine-readable memory medium is provided with a computer program stored on it as described above. Suitable memory media or data carriers for the provision of the computer program are in particular magnetic, optical, and electrical memories, such as hard disks, flash memory, EEPROMs, DVDs, etc. It is also possible to download a program via computer networks (Internet, Intranet, etc.). Such a download can be wired or cabled or wireless (for example via a WLAN network, a 3G, 4G, 5G or 6G connection, etc.).

BRIEF DESCRIPTION OF THE DRAWINGS

Further advantages and embodiments of the invention result from the description and the enclosed drawing.

The invention is schematically illustrated in the drawing by means of an exemplary embodiment and is described below with reference to the drawing.

DETAILED DESCRIPTION

Figure 1:
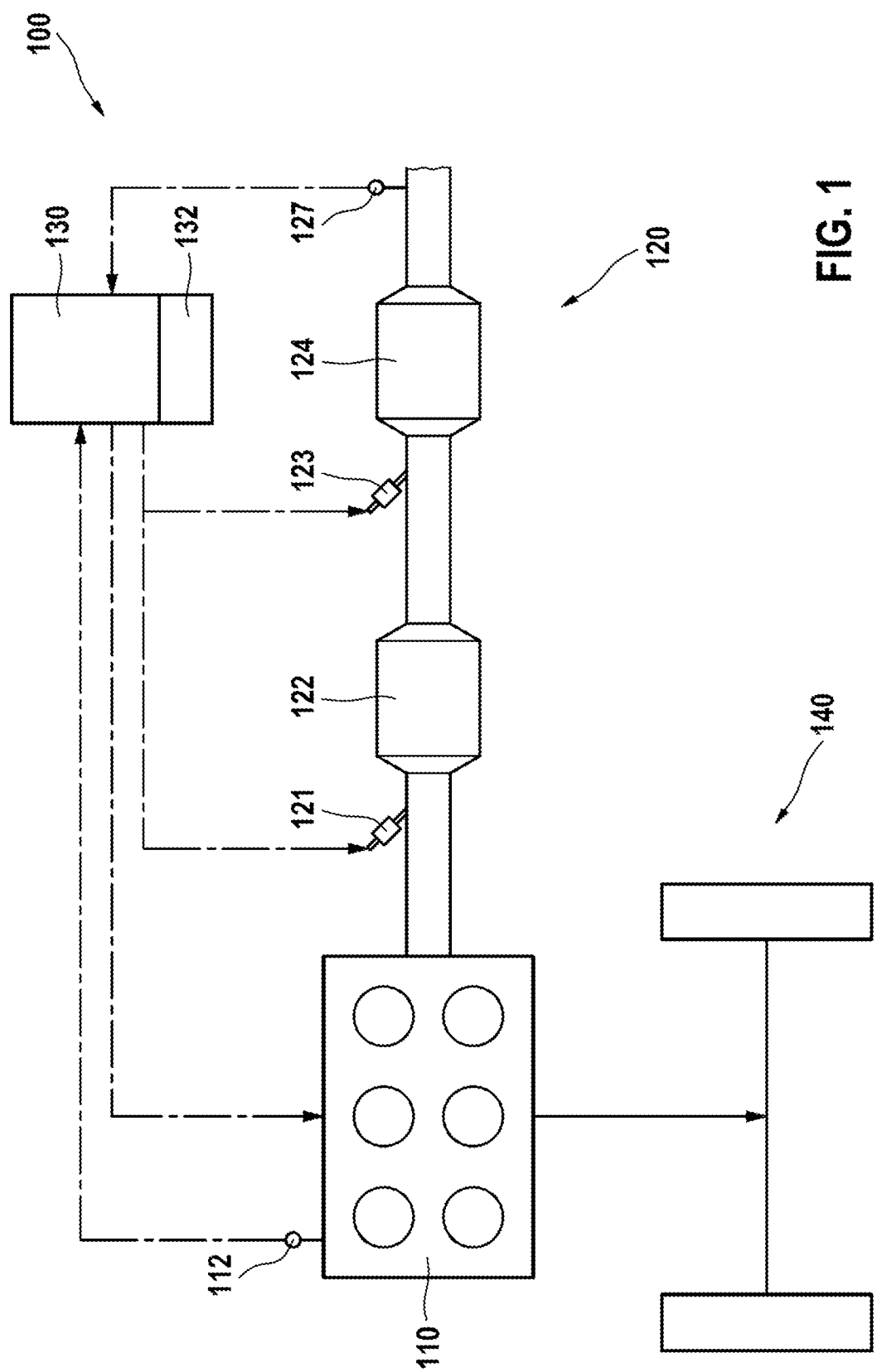
FIG. 1 shows an example of a motor vehicle that can be used in the context of the invention in a schematic representation

In FIG. 1, an example of a motor vehicle, such as can be used in the context of the invention, is shown schematically and designated as a whole by 100. The vehicle 100 comprises a combustion engine 110, here for example with six indicated cylinders, an exhaust system 120, which has multiple cleaning components 122, 124, for example catalytic converters and/or particulate filters, as well as a computing unit 130, which is set up for the control of the combustion engine 110 and the exhaust system 120 and is connected to these for data transfer. Furthermore, the computing unit 130 in the example shown is connected for data transfer to sensors 112, 127 which record the operating parameters of the combustion engine 110 and/or the exhaust system 120. It is understood that there may be other sensors that are not displayed.

Figure 2:
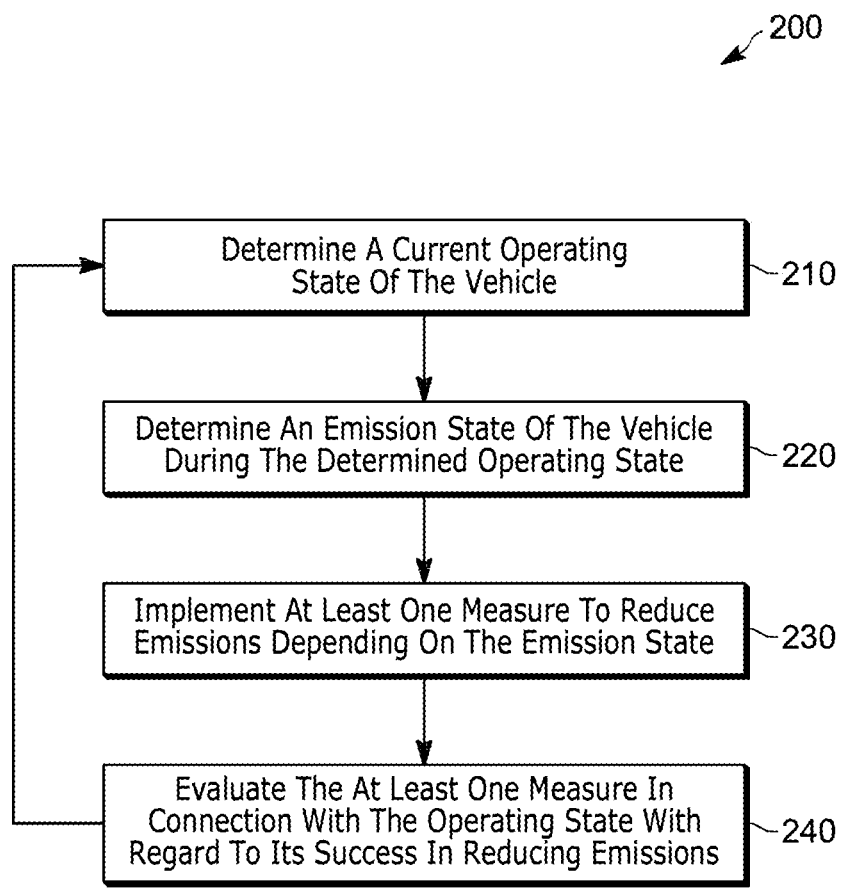
FIG. 2 shows an advantageous embodiment of a method according to the invention in the form of a highly simplified flowchart.

In FIG. 2, an advantageous embodiment of a method according to the invention is schematically presented in the form of a highly simplified flowchart and designated as a whole by 200. The method is also described with reference to FIG. 1.

In a first step 210 of the method 200, one or more operating parameters of the vehicle 100 or the combustion engine 110 are recorded. For this purpose, for example, the sensor 112, for example a thermal sensor and/or a tachometer, can record data and transmit this to the computing unit 130. The detection can also be carried out using models of components of the vehicle, for example a catalytic converter model, which outputs, for example, an oxygen level of the catalytic converter or an ammonia slip through the catalytic converter among other things. From these operating parameters, a current operating state of the vehicle 100 is determined. For example, an engine overrun state can be determined if at the same time a sufficiently high speed of the combustion engine 110 and a very low or missing load requirement are determined.

In a step 220, an emission state of the exhaust system 120 can also be determined. For this purpose, for example, the sensor 127, for example, a lambda sensor and/or a concentration sensor (for example $NH_3$ sensor, $NO_x$ sensor) downstream of a catalytic converter 124 of the exhaust system, can record a current emission value of the exhaust gas leaving the exhaust system 120 and transmit it to the computing unit 130.

The computing unit 130 can then select and initiate one or more measures for emission reduction in a step 230 on the basis of the determined operating state and the emission state.

In a subsequent step 240, the success of the measure(s) is evaluated. For this purpose, the emission state can be determined again during or after the implementation of the measure(s) and compared with the emission state before the implementation of the measure(s). The result of this evaluation can, for example, be stored in a non-volatile memory 132 of the computing unit 130. The respective operating parameters or states, emission states and measures carried out are stored together with the evaluation. For example, the evaluation of the measure(s) carried out may be positive if a sufficiently high emission reduction has been achieved, negative if no emission reduction could be identified and insufficient if an emission reduction could be identified but not sufficient to achieve a target.

In step 230 to be carried out later, evaluations stored in the memory 132 can then be accessed in order to adapt the measure(s) accordingly: for example, in comparable operating state-emission situations, a measure already assessed as positive can preferably be re-selected, while negatively evaluated measures are preferably not re-selected again because no success is to be expected. If a measure has been assessed as inadequate in comparable situations or operating conditions, the corresponding measure is carried out, for example, in later steps 230 with increased intensity or combined with other measures to achieve sufficient emission reduction.

In each subsequent evaluation of a measure, the measure evaluations already carried out in similar operating conditions are preferably weighted with a weighting factor less than 1 in order to take account of an ageing dynamic of the vehicle 100. For example, a measure may include a temperature increase on the catalytic converter 122. For new catalytic converters 122, a minimum operating temperature is typically lower than for already aged catalytic converters 122. Therefore, as the operating time progresses, a temperature increase of a certain extent becomes less effective. A weaker weighting of earlier evaluations compared to later evaluations takes into account the age-related efficacy reduction of the measure faster than would be the case without this weighting.

To illustrate, a specific example is explained here: After a short interruption of the journey (rotation of the wheels 140 stopped, combustion engine 110 switched off; corresponds for example to the start-stop phase operating state, determined for example from operating parameters travel speed and/or revolution rate of the combustion engine 110) with inhibition of engine overrun switch-off (measure), the exhaust gas composition is considered in relation to carbon monoxide (CO) and/or ammonia ($NH_3$) and evaluated in comparison to the exhaust gas composition before the interruption of the journey or in comparison to a trip interruption without am engine overrun inhibit. If the measure (inhibition of engine overrun) is successful, it will continue to be used in similar situations in the future (for example a strong reduction of the driving speed with an imminent stop), while in the case of more negative evaluations this measure is subsequently less likely to be selected and instead preferred other measures (for example a temperature increase on the catalytic converter 122, 124 by means of a heating device 121, 123) are chosen in such situations.

Of course, other combinations of operating states and associated emission scenarios are advantageously usable in the context of the present invention, so that this example is only illustrative and by no means to be considered restrictive. The evaluation and storage within the vehicle result in a massive advantage for the development and application of emission controls, since in principle only available measures, such as emission threshold values and initial selection criteria would have to be stored and the system would then optimize itself in operation. Thus, new measures, for example after retrofitting hardware components, could also be carried out by means of software updates without great application effort, which minimizes resource consumption (for example replacement of ECUs) and workload.

The invention claimed is:

1. A method for operating a motor vehicle with a combustion engine, including
   determining, via a computing unit, a current operating state of the vehicle,
   determining, via the computing unit, an emission state of the vehicle during the determined operating state,
   implementing, via the computing unit, at least one measure to reduce emissions depending on the emission state, the at least one measure including a change in an operating behavior of the combustion engine via an engine control,
   evaluating, via the computing unit, the at least one measure in connection with the operating state with regard to its success in reducing emissions to produce multiple results,
   weighting each result of the multiple results as a function of time, wherein more recent results of the multiple results are weighted more heavily than older results of the multiple results, and
   performing the at least one measure according to the evaluation and weighting of the multiple results of the at least one measure, the emission state, and the current operating state, the at least one measure including at least one selected from the group consisting of a reduction or increase of rich gas components in a catalytic converter purging, a time extension or shortening of a catalytic converter purging, an increase or decrease of a minimum temperature of a catalytic converter, an influence of a catalytic converter lambda control towards a rich or lean target lambda, an adjustment of a target oxygen level in a catalytic converter, a restriction of permissible operating points of the combustion engine, inhibition of engine overrun switch-off, inhibition of start-stop mode, influence on enabling and/or inhibition and/or coordination of intrusive diagnoses, tank ventilation, an operating point shift, dynamic influencing, and exhaust gas recirculation.

2. The method according to claim 1, wherein the evaluation of the at least one measure includes a combination of multiple evaluations carried out in connection with comparable operating conditions and/or in relation to identical measures.

3. The method according to claim 2, wherein the combination of multiple evaluations includes a combination of evaluations concerning multiple driving cycles.

4. The method according to claim 2, wherein the combination of multiple evaluations is carried out by determining an emission state and assigning a frequency of the at least one operating state to the integrated emission state and/or by accumulating separately made evaluations.

5. The method according to claim 1, wherein the implementation of the at least one measure to reduce emissions depending on the emission state includes an implementation of the at least one measure depending on the result of the evaluation(s) and on the current emission state and the operating state.

6. The method according to claim 1, wherein the operating state is determined on the basis of at least one operating parameter, including one or more of the group consisting of a drive power, a torque, a revolution rate, an exhaust gas mass flow, an exhaust gas composition, a catalytic converter state, a temperature of the combustion engine and/or of a catalytic converter, an outside temperature, a driving speed, a geographical position and a personal identity.

7. The method according to claim 1, wherein the emission state includes a current exhaust gas composition and/or a current amount of exhaust gas components selected from the group consisting of carbon monoxide, carbon dioxide, hydrocarbons, nitrogen oxides, ammonia and particles, wherein the emission state is related to an exhaust gas leaving the motor vehicle.

8. A non-transitory, computer-readable medium containing instructions that when executed by a computer cause the computer to control a motor vehicle with a combustion engine, by determining a current operating state of the vehicle,
  determining an emission state of the vehicle during the determined operating state,
  implementing at least one measure to reduce emissions depending on the emission state, the at least one measure including a change in an operating behavior of the combustion engine via an engine control,
  evaluating the at least one measure in connection with the operating state with regard to its success in reducing emissions to produce multiple results,
  weighting each result of the multiple results as a function of time, wherein more recent results of the multiple results are weighted more heavily than older results of the multiple results, and
  performing the at least one measure according to the evaluation and weighting of the multiple results of the at least one measure, the emission state, and the current operating state, the at least one measure including at least one selected from the group consisting of a reduction or increase of rich gas components in a catalytic converter purging, a time extension or shortening of a catalytic converter purging, an increase or decrease of a minimum temperature of a catalytic converter, an influence of a catalytic converter lambda control towards a rich or lean target lambda, an adjustment of a target oxygen level in a catalytic converter, a restriction of permissible operating points of the combustion engine, inhibition of engine overrun switch-off, inhibition of start-stop mode, influence on enabling and/or inhibition and/or coordination of intrusive diagnoses, tank ventilation, an operating point shift, dynamic influencing, and exhaust gas recirculation.

* * * * *